(12) United States Patent
Margo

(10) Patent No.: US 6,394,406 B1
(45) Date of Patent: May 28, 2002

(54) MULTIPURPOSE HOLDER FOR USE BY AN AVIATOR

(76) Inventor: Philip Frederick Margo, 140 S. Almont Dr., Beverly Hills, CA (US) 90211-2505

( * ) Notice: Subject to any disclaimer, the term of this patent is extended or adjusted under 35 U.S.C. 154(b) by 0 days.

(21) Appl. No.: 09/560,537

(22) Filed: Apr. 25, 2000

Related U.S. Application Data

(60) Provisional application No. 60/130,984, filed on Apr. 26, 1999.

(51) Int. Cl.[7] .............................................. A47B 23/00
(52) U.S. Cl. ................................................... 248/441.1
(58) Field of Search ............................. 248/126, 205.2, 248/441.1, 442.2

(56) References Cited

U.S. PATENT DOCUMENTS 4,969,623 A * 11/1990 Bernier .................... 248/441.1
5,154,391 A * 10/1992 Hegarty ...................... 248/454
5,895,023 A * 4/1999 Chao .......................... 248/451

* cited by examiner

Primary Examiner—Ramon O. Ramirez

(57) ABSTRACT

A multipurpose holder for use by an aviator. In one embodiment, the multipurpose holder clamps on to an aircraft control stick. The multipurpose holder includes a main assembly strut of a size and configuration to afford the pilot safe and hands-free holding of printed and other supplementary materials associated with flight. In this embodiment, the multipurpose holder is comprised of a main assembly strut with three segments at defined, optimum angles. The multipurpose holder also comprises a support arm assembly moveably coupled to the main assembly strut such that the support arm assembly and its constituent upper and lower arms may be folded into a compact form for easy carrying when not installed. In another embodiment, the multipurpose holder is attached to a panel in the cockpit of an aircraft.

10 Claims, 4 Drawing Sheets

MULTIPURPOSE HOLDER FOR USE BY AN AVIATOR

BACKGROUND

This application claims benefit of Prov. No. 60/130,984 filed Apr. 26, 1999.

1. Field of the Invention

This invention relates to clip-style assemblies utilized by pilots to hold within easy view air navigation charts, airport directory information, instrument approach information, checklists and other aviation materials required during flight.

2. Background

The many aspects of flying an airplane safely demand an individual's complete attention. Any distraction compromises convenience or even safety. Any fumbling with flight associated materials represents a distraction to the pilot-in-command of an aircraft.

Pilots commonly use a clip-type device to hold the various printed materials necessary for safe flight operations. The existing clip device is specifically designed for installation on the shaft of the airplane's control yoke, which extends horizontally from the aircraft instrument panel and is parallel to the aircraft floor. This enables the pilot to have his or her hands-free to control the flight of the airplane, tune radios for navigation and communication, and generally perform all other functions that are routinely part of flight. However, current chart clip devices are not designed to be installed on an aircraft control stick, which extends vertically from the control linkages and is perpendicular to the aircraft floor. Those piloting control stick flown aircraft do not have the same hands-free stick-mounted option as their yoke-control counterparts owing to the fact that there is no chart-clip device currently available that attaches to a control stick. Thus, both the safety and convenience of those pilots flying stick-controlled aircraft are compromised.

Current aviation chart clip devices do not install on an aircraft control stick, as opposed to a control yoke. Current aviation chart clip devices are not adjustable in a variety of axes, both horizontal and vertical. Current aviation chart clip devices do not have adjustable support arms. Current aviation chart clip devices do not allow for multi-plane motion when attached in the cockpit.

BRIEF SUMMARY OF THE INVENTION

The multipurpose holder for use by an aircraft pilot is, in one embodiment, an invention designed to clamp on in seconds to an aircraft control stick. The multipurpose holder includes a main assembly strut of a size and configuration to afford the pilot safe and hands-free holding of printed and other supplementary materials associated with flight. In this embodiment, the multipurpose holder is comprised of a main assembly strut with three segments at defined, optimum angles. The multipurpose holder also comprises a support arm assembly moveably coupled to the main assembly strut such that the support arm assembly and its constituent upper and lower arms may be folded into a compact form for easy carrying when not installed. In another embodiment, the multipurpose holder is attached to a panel in the cockpit of an aircraft.

DETAILED DESCRIPTION

A. A Multipurpose Holder Mountable on the Control Stick of an Aircraft

Figure 1:
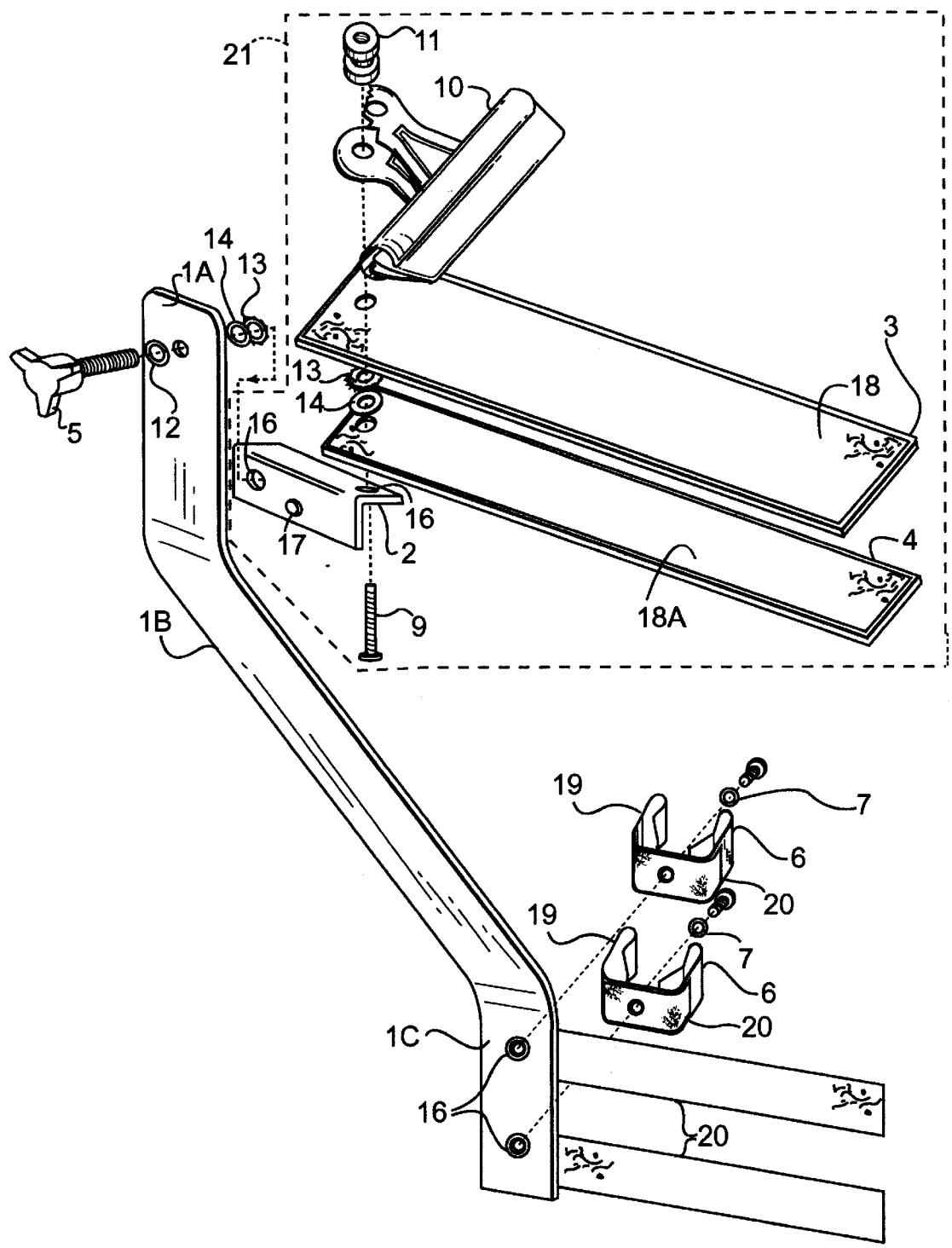
FIG. 1 illustrates an exploded view of an embodiment of the multipurpose holder mountable on the control stick of an aircraft.
Figure 2:
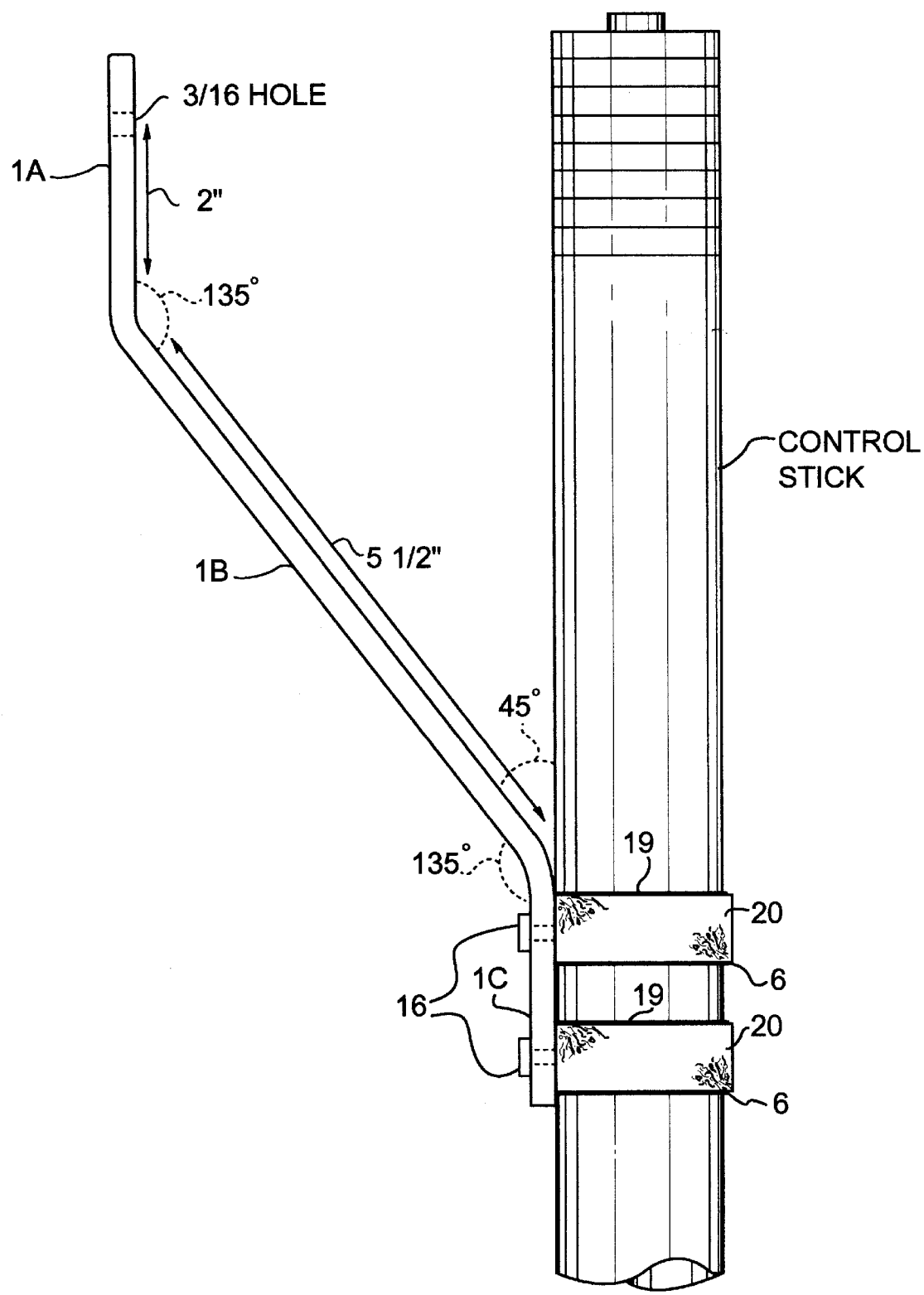
FIG. 2 illustrates a side view of the main assembly strut of an embodiment of the multipurpose holder.

FIG. 1 illustrates an exploded view of an embodiment of the multipurpose holder mountable on the control stick, which extends vertically from the control linkages and is perpendicular to the aircraft floor. In accordance with the present invention, in one embodiment, a multipurpose holder for use by an aircraft pilot may be attached to the control stick of an aircraft. In this embodiment, the multipurpose holder comprises a main assembly strut 1 with an upper segment 1A angled inside at 135 degrees from middle segment 1B, and a lower segment 1C at the bottom angled out at 135 degrees. This is more clearly seen by review of FIG. 2. FIG. 2 illustrates a side view of the main assembly strut of an embodiment of the multipurpose holder mountable on the control stick of an aircraft. Another way of considering this arrangement is that upper segment 1A and lower segment 1C are parallel to the control stick when the multipurpose holder is in position for use. Further, middle section 1B slants out from the control stick at an angle of 45 degrees. This angle occurs at the border between middle section 1B and lower section 1C.

Referring again to FIG. 1, in one embodiment, the upper and lower segments may be approximately 2" long and the middle segment may be 5 ½" long. A support arm assembly 21 is coupled to main assembly strut 1. In one embodiment, the support arm assembly 21 is comprised of support arm bracket 2.

Figure 3A:
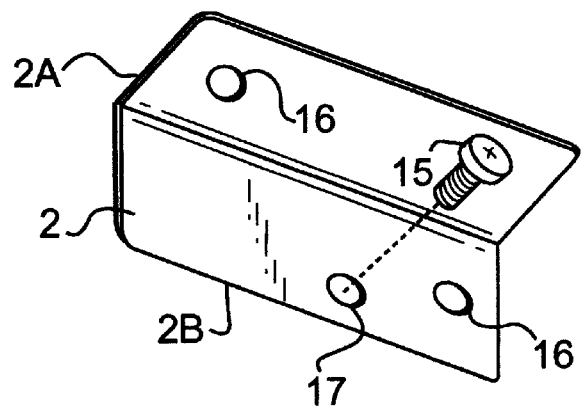
FIG. 3A illustrates a bottom view of a support arm bracket of an embodiment of the multipurpose holder.
Figure 3B:
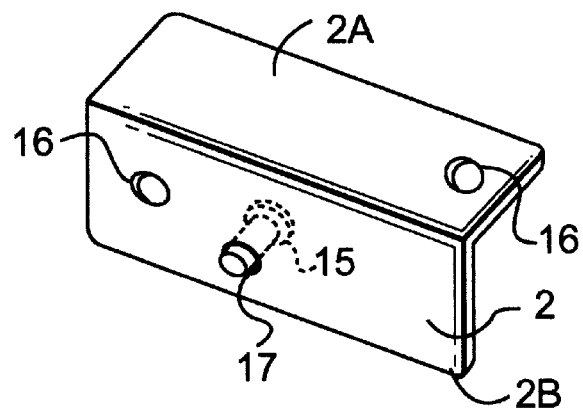
FIG. 3B illustrates a top view of a support arm bracket of an embodiment of the multipurpose holder.
Figure 3C:
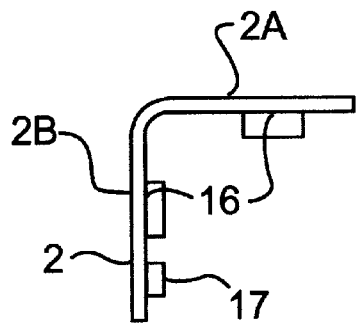
FIG. 3C illustrates a front view of a support arm bracket of an embodiment of the multipurpose holder.

FIG. 3A illustrates a bottom view of the support arm bracket of an embodiment of the multipurpose holder. FIG. 3B illustrates the top view of the support arm bracket of an embodiment of the multipurpose holder. FIG. 3C illustrates the front view of the support arm bracket of an embodiment of the multipurpose holder. In one embodiment, support arm bracket 2 measures 1 ½" long and is flexed at 90 degrees to form ⅝"×1 ½" segments 2A and 2B. In on embodiment a two ¹⁰⁄₃₂" self-clenching nuts 16 and one ⁶⁄₃₂" aluminum self-clenching nut 17 are fixed to support arm bracket 2. One ¹⁰⁄₃₂" self-clenching nut is secured ⁵⁄₁₆" from the end and ⁵⁄₁₆" from the edge of support arm bracket segment 2A. A second ¹⁰⁄₃₂" self-clenching nut is fixed on the opposing side of support arm segment 2B ⁵⁄₁₆" from the end and ⁵⁄₁₆" from the edge. A ⁶⁄₃₂" self-clenching nut 17 is attached to support arm segment 2B ⅛" from the bottom edge and ¾" from the back end.

Referring again to FIG. 1, support arm bracket 2 is coupled to upper segment 1A of main assembly strut 1, upper support arm 3 and lower support arm 4. In one embodiment, support arm bracket 2 is attached to main assembly strut 1 by an arrangement of clamping knob 5, external and internal tooth lock washers 13 and 14, standard washer 12, a self clenching nut 16 and bolt 9. In one embodiment, clamping knob 5 is a ¹⁰⁄₃₂"×¾" clamping knob, and the external and internal tooth lock washers the standard washer and the self clenching nut are all ¹⁰⁄₃₂". This arrangement enables the support arm assembly to be rotated and fixed at any point that the pilot considers optimum for its use in holding flight related items. This arrangement also allows the multipurpose holder to be installed at any point around a curved or straight aircraft control stick that the pilot requires. A ⁹⁄₃₂" self-clenching aluminum nut 17 provides seating for a nylon screw 15 to be engaged and provide an additional means of securing support arm assembly in the optimum position.

Upper support arm 3 and lower support arm 4 are movably coupled at their proximal ends to support arm bracket 2, in one embodiment, with machine screw 9 seated in self-clenching nut 16, external tooth and internal tooth lock washers 13 and 14, standard washer 12 and fastener 11.

In one embodiment, upper support arm 3 and lower support arm 4 are movably coupled to the support arm bracket with a ¹⁰⁄₃₂×1 " pan Philips machine screw, ¹⁰⁄₃₂ external tooth and internal tooth lock washers, a standard ¹⁰⁄₃₂ washer self-clenching nut and a knurled brass fastener. This arrangement enables the support arms to rotate in a plane of 360 degrees and to open and close in a fan-like fashion. This arrangement provides for the adjustment the support arms to a desired position such that once the support arms are in a desired position, the support arms may be fixed by tightening down knurled brass fastener 11.

In one embodiment, upper support arm 3 may be 6 ½ inches in length and 1 ⅛ inches wide, and lower support arm 4 is 6 ½ inches in length and ⅝ of an inch wide. In one embodiment, the upper and lower support arms are layered on their upper surface with one half of a hook and loop fastening system. In one embodiment, the hook and loop fastening system commences ½" from the proximal end of the support arms. Support arm 3 employs a 6"×1 ⅛" loop strip 18 and support arm 4 employs a 6"×⅝" loop strip of a hook and loop fastening system 18A (such as Velcro). This utilization of the hook and loop attaching system provides a mounting location for a flight computer, a stopwatch, or a Global Positioning System (GPS) employing the hook side of the hook and loop fastening system to secure in position. Other items regularly used by pilots may also be removable attached to the support arms in a similar manner. In addition, clip 10 or other holding device may be included between fastener 11 and upper support arm 3 for holding papers, maps, documents, and other items that may be used by a pilot.

The multipurpose holder may be removably attached onto the most convenient section of the aircraft control stick. In one embodiment, two vinyl-coated spring clamps are coupled to the lower segment 1C of main assembly strut 1 and are used for attaching the multipurpose holder onto the control stick, as shown in FIG. 2. In one embodiment, the two vinyl-coated spring clamps 6 are externally layered with two 4 "×⅝" strips of the loop part of a hook and loop fastening system 19 so that the hook and loop fastening system augments the spring clamps for removably attaching the multipurpose holder to the control stick. In one embodiment, ¹⁰⁄₃₂×⅜ pan Phillips head machine screws 7 and ¹⁰⁄₃₂ aluminum self clenching nuts 16 are used to couple spring clamps 6 to lower segment 1C. The multipurpose holder is secured to the control stick of an aircraft by two 6"×⅝" strips of the hook section of a hook and loop fastening system 20 that wrap around the control stick and lock with the loop section that lines spring clamps 6, as shown in FIG. 2. Spring clips 6 of various sizes may be used in various embodiments so as to adapt to the most commonly used stick diameters, including military and international aircraft applications. In other embodiments, only one large spring clamp may be used, and other fastening and attachment means may be used for removably attaching the multipurpose holder to the control stick.

The angular design of main assembly strut 1(see FIG. 2) allows for clearance of both the instrument panel and the pilot's legs while permitting full and unimpeded stick travel through all axes. This allows the pilot to position the invention so that the supported materials are level or higher than the top of the joystick without impeding the pilot's grip on the stick itself. The pilot is provided with various options for positioning and supporting the flight materials held in clip 10. Loosening or tightening clamping knob 5 and fastener 11 facilitates horizontal and vertical motion of the multipurpose holder and locks down the multipurpose holder's adjustable components at pilot desired levels and angles.

Accordingly, a stick-mountable embodiment of the multipurpose holder may be installed on a control stick of an aircraft whether straight or curved. The adjustable components of the multipurpose holder provide ample horizontal and vertical mobility so as to afford a pilot the options of viewing various flight-related related materials and items at the most comfortable angles in terms of light, clearance and distance. The multipurpose holder may be installed on any segment of the circumference of the control stick. The multipurpose holder is designed to avoid interference with a pilot's physicality such that the pilot's control input to the aircraft are not impeded. The multipurpose holder is of a size compact enough to avoid contact with the aircraft instrument panel or any other component of the aircraft cabin structure. The design of the multipurpose holder allows full and unhindered stick travel through all axes.

The multipurpose holder is lightweight and does not significantly unbalance the action of the control stick. In one embodiment, the main assembly strut, upper support arm, and lower support arm are all made of aluminum. Any other similarly light and sturdy material may be used. In one embodiment, the main assembly strut is constructed of ⅛ gauge anodized aluminum and the support arm bracket, upper support arm, and lower support arm are constructed of anodized 0.090 gauge aluminum. The foldable arrangement of the upper and lower support arms in relation to the main assembly strut allow the multipurpose holder to be easily stowed in a flat configuration and rotated out of the way when not in use.

The multipurpose holder gives the pilot flying a stick-controlled aircraft the same hands free mode of operation as his or her counterparts who have yoke controlled equipped aircraft. Accordingly, this invention may be mounted on any part of the circumference of the aircraft control stick so as to provide a non-intrusive holder for printed and other supplementary materials pilots often utilize in flight. Up until now this option has not been available to pilots of stick controlled aircraft.

B. A Multipurpose Holder Mountable On A Panel Of An Aircraft Cockpit

Figure 4:
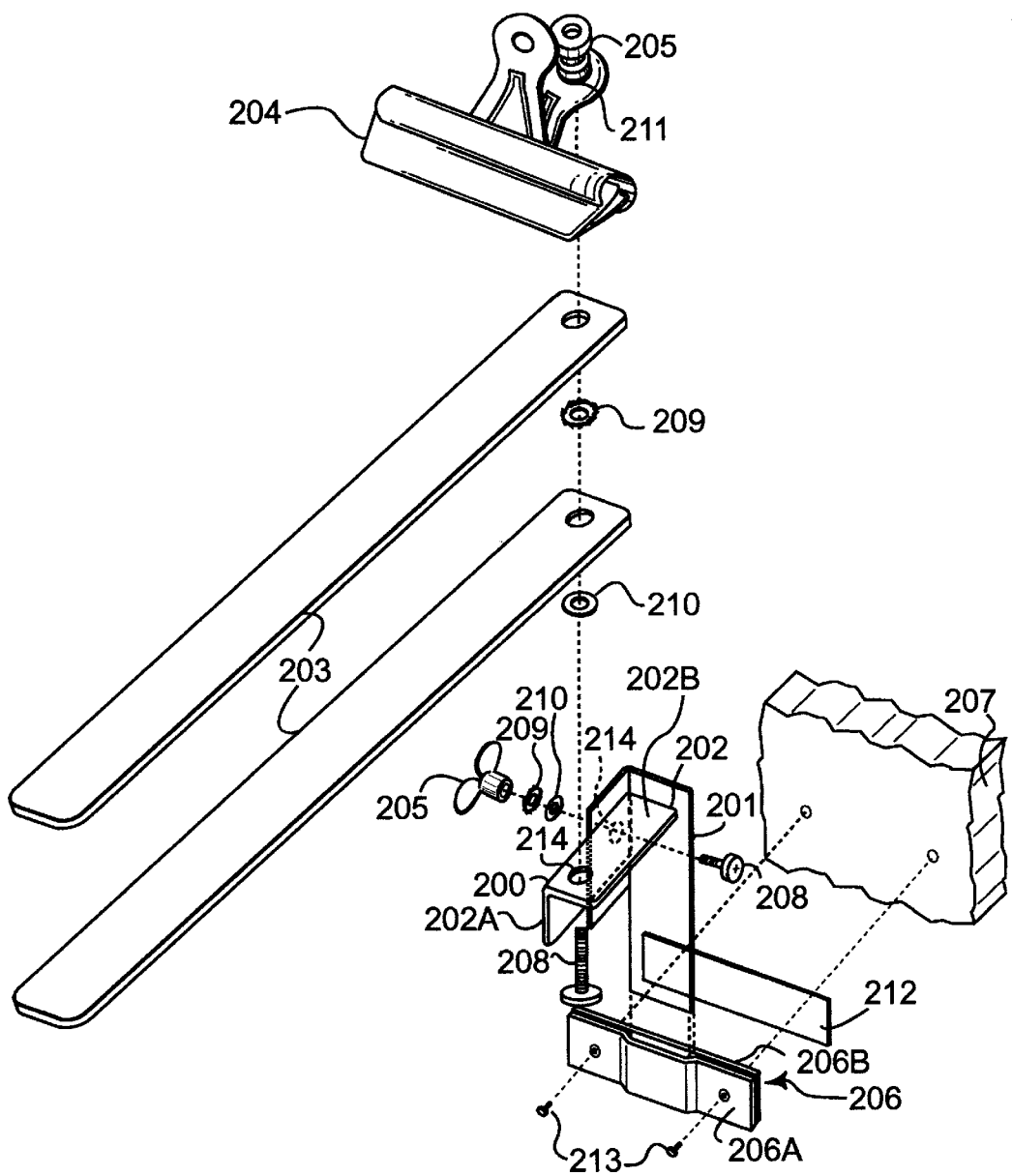
FIG. 4 illustrates an exploded view of an alternate embodiment of the multipurpose holder.
Figure 4A:
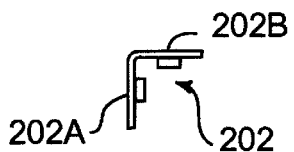

FIG. 4 illustrates an exploded view of an alternate embodiment of the multipurpose holder mountable on a panel of an aircraft cockpit. In this embodiment, a unit support plate assembly comprising a grooved front plate segment 206A and an aft flat plate segment 206B coupled with two ⅛" aluminum rivets 213. The grooved front plate measures 2 ½" by ⅝ with a center groove of ⅛'×⅝" the aft flat plate measures 2 ½"×⅝. In one embodiment, heavy-duty double-sided tape 212 is affixed to the outside rear section of the aft flat plate segment of the assembled unit support plate 206 to allow it to be removably mounted to a convenient location on the instrument panel of a cockpit. The support arm bracket 202 which in one embodiment measures 1 ½" long and is flexed at 90 degrees to form ⅝"×1 ½" segments 202A and 202B. In one embodiment two 10/32" self-clenching nuts 214 are fixed to support arm bracket 202, (FIG. 4A). One 10/32" self-clenching nut is secured 5/16" from the end and 5/16" from the edge of support arm bracket segment 202A. A second 10/32" self-clenching nut is fixed on the opposing side of support arm bracket segment 202B 5/16" from the end and 5/16" from the edge. In one embodiment the support arm bracket 202 is attached to the support arm brace 201 through the use of a 10/32 wing nut 205, internal and external toothed washers and 10/32×½ pan Phillips head screw 208. The upper and lower support arms 203 are coupled to a support arm bracket 202 using a 10/32×½" pan Phillips head screw 208, 10/32 internal toothed washers 210, external toothed washers 209, a 10/32 standard washer 211 and a 10/32 wing nut 205. The wing nut also secures a #2 clip 204. The support arm brace is 201 removably affixed to the unit support plate assembly 206 by inserting its ⅛"×⅝" tongue into the corresponding groove in the unit support plate assembly 206. In one embodiment, the unit support plate assembly 206, the upper and lower support arms 203, the support arm bracket 202 and the support arm brace 201 are constructed of 0.090 anodized aluminum. Any other similarly light and sturdy material may be used.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A multipurpose holder for use by an aviator comprising:
   a main assembly strut removably attachable to the control stick of an aircraft;
   a support arm assembly movably coupled to the main assembly strut to hold items for pilot viewing.

2. The multipurpose holder of claim 1 such that the upper support arm and the lower support arm may be folded for stowing or transport.

3. The multipurpose holder of claim 2 wherein the main assembly strut is constructed such that the upper segment of the main assembly strut and a lower segment of the main assembly strut remain parallel to the control stick when removeably attached to the control stick, and such that a middle portion of the main assembly strut is slanted at approximately an angle of 45 degrees away from the control stick.

4. The multipurpose holder of claim 1 wherein the main assembly strut is constructed such that the lower segment of the main assembly strut and the upper segment of the main assembly strut are each approximately an angle of 135 degrees from a middle portion of the main assembly strut.

5. The multipurpose holder of claim 1 wherein the support arm assembly further comprises:
   a clip coupled above the upper arm.

6. The multipurpose holder of claim 1 wherein the upper surface of the upper support arm and the upper surface of the lower support arm are have attached thereto one half of a hook and loop fastening system.

7. The multipurpose holder of claim 1 further comprising:
   at least one spring clamp coupled to the lower segment of the main assembly strut large enough to removably attach the multipurpose holder to the control stick of an aircraft.

8. The multipurpose holder of claim 7 wherein the spring clamp is externally augmented with one half of a hook and loop fastening system.

9. A multipurpose holder for use by an aviator operating a stick controlled aircraft comprising:
   a support arm assembly movably coupled to a support arm bracket, the support arm assembly including an upper support arm and a lower support arm such that the upper support arm and the lower support arm are movable in a plane and may be set in a fixed position;
   a support plate assembly to be fixed to the panel of an aircraft and configured to receive the support arm bracket.

10. The multipurpose holder of claim 9 wherein the support arm assembly further comprises:
    a clip coupled above the upper support arm.

* * * * *